United States Patent
Hirooka et al.

(10) Patent No.: US 11,532,945 B2
(45) Date of Patent: Dec. 20, 2022

(54) CONTROL DEVICE FOR VEHICLE

(71) Applicant: TOYOTA JIDOSHA KABUSHIKI KAISHA, Toyota (JP)

(72) Inventors: Shigemasa Hirooka, Susono (JP); Shingo Korenaga, Shizuoka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 309 days.

(21) Appl. No.: 17/083,878

(22) Filed: Oct. 29, 2020

(65) Prior Publication Data

US 2021/0135483 A1 May 6, 2021

(30) Foreign Application Priority Data

Nov. 5, 2019 (JP) .............................. JP2019-200937

(51) Int. Cl.
*F01N 3/20* (2006.01)
*H02J 7/14* (2006.01)
*H02J 7/00* (2006.01)

(52) U.S. Cl.
CPC .......... *H02J 7/1492* (2013.01); *F01N 3/2006* (2013.01); *H02J 7/0068* (2013.01)

(58) Field of Classification Search
CPC ...... H02J 7/1492; H02J 7/0068; H02J 7/1438; H02J 2310/48; H02J 7/0048; F01N 3/2006; F01N 9/00; F01N 3/2013; F01N 11/002; F01N 13/00; B60W 20/11; B60W 2510/068; B60W 2510/244; B60W 2710/305; B60W 10/30; B60W 20/16; Y02A 50/20; Y02T 10/12; Y02T 10/62; Y02T 10/70; B60K 6/24; B60K 6/445
See application file for complete search history.

(56) References Cited

FOREIGN PATENT DOCUMENTS

| JP | 10-288028 A | 10/1998 |
| JP | 2016-203770 A | 12/2016 |
| JP | 2016203770 A | * 12/2016 |

* cited by examiner

*Primary Examiner* — Brandon D Lee
(74) *Attorney, Agent, or Firm* — Oblon, McClelland, Maier & Neustadt, L.L.P.

(57) ABSTRACT

A control device for a vehicle is provided with a catalyst warmup control part supplying electric power to a conductive base to warm up a catalyst device if the temperature of the conductive base is less than a predetermined temperature and the state of charge of the battery is less than a second state of charge larger than a first state of charge when the state of charge of the battery is equal to or greater than the predetermined first state of charge and a driving mode of the vehicle is set to an EV mode in which at least the output of the rotary electric machine is controlled to make the vehicle run. The catalyst warmup control part sets the second state of charge so that the second state of charge becomes larger in the case where the resistance value of the conductive base is large compared to when it is small.

2 Claims, 7 Drawing Sheets

CONTROL DEVICE FOR VEHICLE

FIELD

The present disclosure relates to a control device for a vehicle.

BACKGROUND

Japanese Unexamined Patent Publication No. 10-288028 discloses a hybrid vehicle provided with an internal combustion engine and a rotary electric machine (electric motor) as sources of drive power and providing an electrically heated catalyst (EHC) comprised of a conductive base on which a catalyst is carried in an exhaust passage of the internal combustion engine. Further, Japanese Unexamined Patent Publication No. 10-288028 discloses, as a control device of this hybrid vehicle, one configured to be able to electrically heat the catalyst device before starting up the internal combustion engine if, when driving the rotary electric machine to make the vehicle run, the state of charge of the battery falls and the internal combustion engine has to be started up.

SUMMARY

However, if aging etc. cause the conductive base to increase in resistance value, the current flowing through the conductive base falls by exactly the amount of increase of the resistance value and the electric power supplied to the conductive base falls, so the time required for finishing warmup of the catalyst device, that is, the heating time for electrically heating the catalyst device, becomes longer. In the time period when electrically heating the catalyst device, in addition to the electric power supplied to the conductive base, driving-use electric power becomes necessary for driving the rotary electric machine to make the vehicle run. For this reason, if the heating time becomes longer, the amount of driving-use electric power required until completing warmup of the catalyst device increases by exactly the amount by which the heating time becomes longer and as a result the amount of electric power required until completing warmup of the catalyst device increases.

Therefore, if, like with the above-mentioned conventional control device of a vehicle, ending up setting the value of the state of charge of the battery serving as the threshold value for starting supply of drive power to the conductive base without considering the resistance value of the conductive base, even if starting to heat the catalyst device before starting up the internal combustion engine, the state of charge of the battery is liable to become less than a predetermined state of charge and the internal combustion engine is liable to have to be started before the catalyst device finishes warming up.

The present disclosure was made focusing on such a problem point and has as its object to keep the state of charge of the battery from becoming less than a predetermined state of charge before the catalyst device finishes warming up and the internal combustion engine ending up being started up if driving the rotary electric machine to make the vehicle run and electrically heating the catalyst device to warm up the catalyst device.

To solve this problem, a vehicle according to one aspect of the present disclosure is provided with an internal combustion engine, an electrically heated catalyst device provided in an exhaust passage of the internal combustion engine and comprised of a conductive base generating heat by the supply of current and carrying a catalyst, a rechargeable battery, and a rotary electric machine driven by electric power of the battery. Further, the control device of the vehicle is comprised of a catalyst warmup control part configured to supply electric power to the conductive base to warm up the catalyst device if the temperature of the conductive base is less than a predetermined temperature and the state of charge of the battery is less than a second state of charge larger than a predetermined first state of charge when the state of charge of the battery is equal to or greater than the first state of charge and a driving mode of the vehicle is set to an EV mode in which at least the output of the rotary electric machine is controlled to drive the vehicle. Further, the catalyst warmup control part sets the second state of charge so that the second state of charge becomes larger in the case where the resistance value of the conductive base is large compared to when it is small.

According to this aspect of the present disclosure, the state of charge for starting warmup (second state of charge) is made larger if the resistance value of the conductive base is large compared to if it is small, so the state of charge of the battery can be kept from ending up falling to the first state of charge before the catalyst device finishes warming up. Therefore, the internal combustion engine can be kept from ending up being started up before the catalyst device finishes warming up.

DESCRIPTION OF EMBODIMENTS

Figure 1:
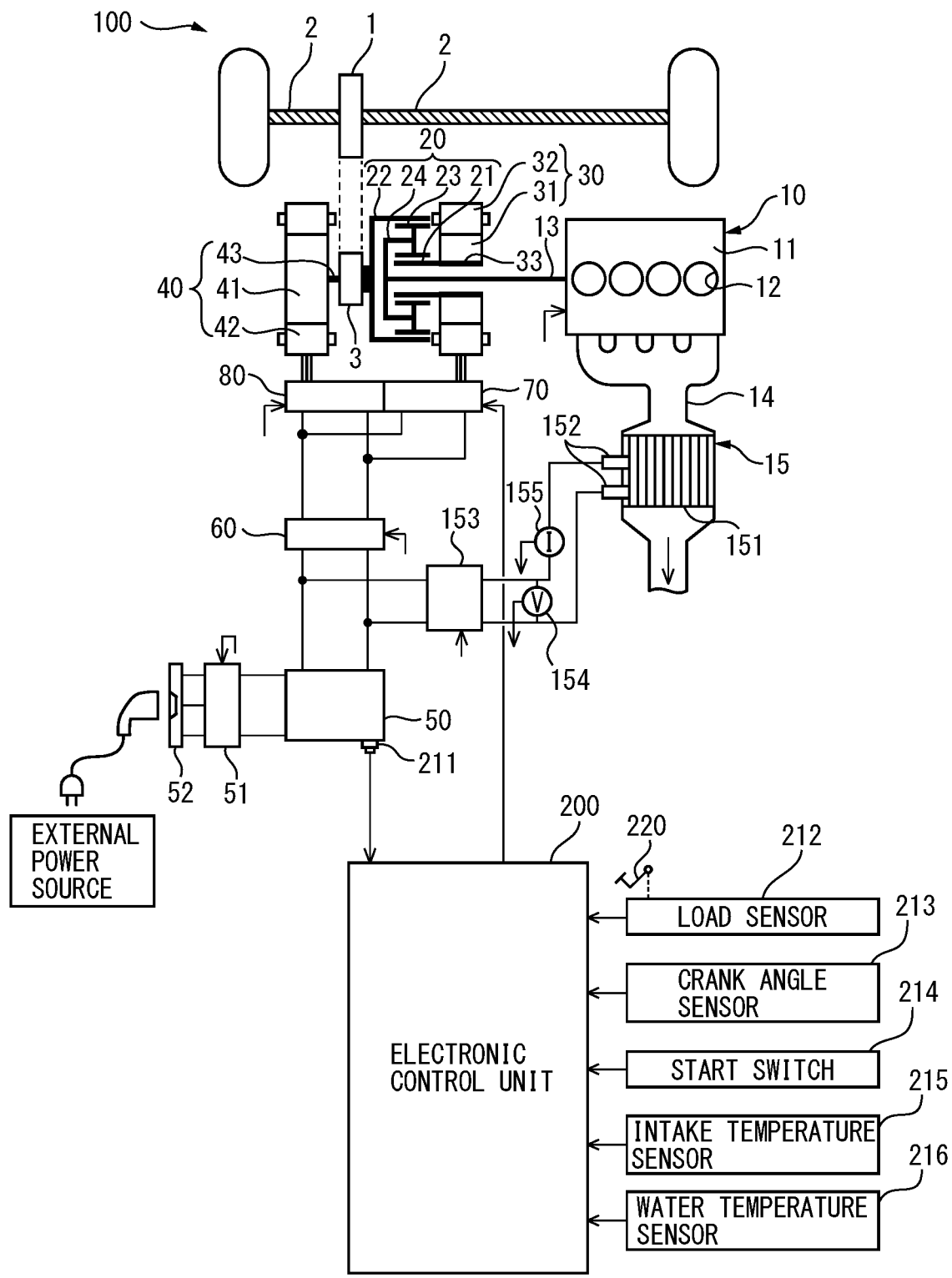
FIG. 1 is a schematic view of the configuration of a vehicle and an electronic control unit for controlling the vehicle according to one embodiment of the present disclosure.

Below, embodiments of the present disclosure will be explained with reference to the drawings. Note that, in the following explanation, similar constituent elements are assigned the same reference numerals.

FIG. 1 is a schematic view of the configuration of a vehicle 100 and an electronic control unit 200 for controlling the vehicle 100 according to a first embodiment of the present disclosure.

The vehicle 100 according to the present embodiment is a hybrid vehicle provided with an internal combustion engine 10, power dividing mechanism 20, first rotary electric machine 30, second rotary electric machine 40, battery 50, boost converter 60, first inverter 70, and second inverter 80 and is configured to be able to transmit one or both drive powers of the internal combustion engine 10 and the second rotary electric machine 40 through a final speed reduction device 1 to a wheel drive shaft 2.

The internal combustion engine 10 makes fuel burn in cylinders 12 formed in the engine body 11 to generate drive power for making an output shaft 13 coupled to a crankshaft (not shown) rotate. The exhaust discharged from the cylinders 12 to an exhaust passage 14 flows through the exhaust passage 14 and is discharged into the atmosphere. The exhaust passage 14 is provided with an electrically heated catalyst device 15 for removing harmful substances in the exhaust.

The electrically heated catalyst device 15 is provided with a conductive base 151, a pair of electrodes 152, a voltage adjustment circuit 153, a voltage sensor 154, and a current sensor 155.

The conductive base 151 is for example formed from silicon carbide (SiC) or molybdenum disulfide ($MoSi_2$) or another material generating heat upon being supplied with current. The conductive base 151 is formed with a plurality of passages (below, "unit cells") of lattice shaped (or honeycomb shaped) cross-sections along the direction of flow of exhaust. The surfaces of the unit cells carry the catalyst. The catalyst carried at the conductive base 151 is not particularly limited. It is possible to suitably select the catalyst required for obtaining the desired exhaust purification performance from among various catalysts and make the conductive base 151 carry it.

The pair of electrodes 152 are parts for applying voltage to the conductive base 151. The pair of electrodes 152 are respectively electrically connected to the conductive base 151 and are connected through the voltage adjustment circuit 153 to the battery 50. By applying voltage to the conductive base 151 through the pair of electrodes 152, current flows through the conductive base 151 so the conductive base 151 generates heat and the catalyst carried on the conductive base 151 is heated.

The voltage $V_h(V)$ applied to the conductive base 151 by the pair of electrodes 152 (below, referred to as the "base applied voltage") can be adjusted by using the electronic control unit 200 to control the voltage adjustment circuit 153. For example, it is possible to apply the voltage of the battery 50 as it is or to apply the voltage of the battery 50 boosted or lowered to any voltage. In this way, in the present embodiment, by using the electronic control unit 200 to control the voltage adjustment circuit 153, it becomes possible to control the electric power $P_h(kW)$ supplied to the conductive base 151 (below, referred to as the "base supplied electric power") to any electric power.

The voltage sensor 154 detects the base applied voltage $V_h$. In the present embodiment, the voltage adjustment circuit 153 is controlled based on the base applied voltage $V_h$ detected by the voltage sensor 154 so that the base applied voltage $V_h$ becomes a predetermined rated voltage $V_{max}$.

The current sensor 155 detects the value of the current $I_h(A)$ flowing through the conductive base 151 when applying voltage to the conductive base 151. In the present embodiment, it detects the resistance value R (Ω) of the conductive base 151 (below, referred to as the "base resistance value") based on the base applied voltage $V_h$ and the current value $I_h$.

The power division mechanism 20 is a planetary gear for dividing the power of the internal combustion engine 10 into two systems of the power for turning the wheel drive shaft 2 and power for driving the first rotary electrical machine 30 in a regeneration mode and is provided with a sun gear 21, ring gear 22, pinion gears 23, and a planetary carrier 24.

The sun gear 21 is an external gear and is arranged at the center of the power division mechanism 20. The sun gear 21 is connected with a shaft 33 of the first rotary electrical machine 30.

The ring gear 22 is an internal gear and is arranged around the sun gear 21 so as to become concentric with the sun gear 21. The ring gear 22 is connected with a shaft 33 of the second rotary electrical machine 40. Further, the ring gear 22 has integrally attached to it a drive gear 3 for transmitting rotation of the ring gear 22 to the wheel drive shaft 2 through the final deceleration device 1.

A pinion gear 23 is an external gear. A plurality are arranged between the sun gear 21 and ring gear 22 so as to mesh with the sun gear 21 and ring gear 22.

The planetary carrier 24 is connected to the output shaft 13 of the internal combustion engine 10 and rotates about the output shaft 13. Further, the planetary carrier 24 is also connected to the pinion gears 23 so as to enable the pinion gears 23 to revolve (orbit) around the sun gear 21 while individually rotating on their axes when the planetary carrier 24 rotates.

The first rotary electrical machine 30 is, for example, a three-phase AC synchronous type motor-generator and is provided with a rotor 31 attached to the outer circumference of the shaft 33 coupled with the sun gear 21 and having a plurality of permanent magnets embedded in its outer circumference and a stator 32 around which is wound an excitation coil generating a rotating magnetic field. The first rotary electrical machine 30 has the function of a motor receiving the supply of power from the battery 50 and being driven in a power running mode and the function of a generator receiving power from the internal combustion engine 10 and being driven in a regeneration mode.

In the present embodiment, the first rotary electrical machine 30 is mainly used as a generator. Further, when making the output shaft 13 rotate for cranking at the time of startup of the internal combustion engine 10, it is used as a motor and plays the role of a starter.

The second rotary electrical machine 40 is, for example, a three-phase AC synchronous type motor-generator. It is provided with a rotor 41 attached to the outer circumference of the shaft 43 connected to the ring gear 22 and having a plurality of permanent magnets embedded in its outer circumferential part and with a stator 42 around which an excitation coil generating a rotating magnetic field is wound. The second rotary electrical machine 40 has the function as a motor receiving the supply of power from a battery 50 and being driven in a power running mode and the function as a generator receiving power from the wheel drive shaft 2 and being driven in a regeneration mode at the time of deceleration of the vehicle etc.

The battery 50 is, for example, a nickel-cadmium storage battery or nickel-hydrogen storage battery, lithium ion battery, or other rechargeable secondary battery. In the present embodiment, as the battery 50, a lithium ion secondary battery with a rated voltage of 200V or so is used. The battery 50 is electrically connected through a boost converter 60 etc. to the first rotary electrical machine 30 and second rotary electrical machine 40 so as to enable charged power of the battery 50 to be supplied to the first rotary electrical machine 30 and second rotary electrical machine 40 and drive them in the power running mode and, further, so as to enable the generated power of the first rotary electrical machine 30 and second rotary electrical machine 40 to charge the battery 50.

Further, the battery 50 according to the present embodiment is, for example, configured to be able to be electrically connected to the external power source through the charging control circuit 51 and a charging lid 52 so that charging from a home electrical outlet or other external power source becomes possible. Therefore, the vehicle 100 according to the present embodiment is a so-called "plug-in hybrid vehicle". The charging control circuit 51 is an electrical circuit which can convert the AC current supplied from the external power source to DC current based on a control signal from the electronic control unit 200 and can boost the input voltage to the battery voltage and charge the electric power of the external power source to the battery 50.

The boost converter 60 is provided with an electrical circuit boosting the terminal voltage of the primary side terminal and outputting it from the secondary side terminal based on a control signal from the electronic control unit 200 and conversely lowering the terminal voltage of the secondary side terminal and outputting it from the primary side terminal based on a control signal from the electronic control unit 200. The primary side terminal of the boost converter 60 is connected to the output terminal of the battery 50, while the secondary side terminal is connected to the DC side terminals of the first inverter 70 and second inverter 80.

The first inverter 70 and second inverter 80 are provided with electrical circuits enabling them to convert direct currents input from the DC side terminals to alternating currents (in the present embodiment, three-phase alternating currents) and output them from the AC side terminals based on a control signal from the electronic control unit 200 and conversely to convert alternating currents input from the AC side terminals to direct currents and output them from the DC side terminals based on a control signal of the electronic control unit 200. The DC side terminal of the first inverter 70 is connected to the secondary side terminal of the boost converter 60, while the AC side terminal of the first inverter 70 is connected to the input/output terminal of the first rotary electrical machine 30. The DC side terminal of the second inverter 80 is connected to the secondary side terminal of the boost converter 60, while the AC side terminal of the second inverter 80 is connected to the input/output terminal of the second rotary electrical machine 40.

The electronic control unit 200 is a microcomputer provided with components connected to each other by a bidirectional bus such as a central processing unit (CPU), read only memory (ROM), random access memory (RAM), or other memory, input port, and output port.

The electronic control unit 200 receives as input the output signals from various types of sensors such as the above-mentioned voltage sensor 154 or current sensor 155 and also an SOC sensor 211 for detecting a state of charge of the battery SOC, a load sensor 212 generating an output voltage proportional to the amount of depression of an accelerator pedal 220, a crank angle sensor 213 generating an output pulse as a signal for calculating the engine speed etc. each time a crankshaft (not shown) of the engine body 11 rotates by, for example, 15°, a start switch 214 for judging startup and stopping of the vehicle 100, an intake temperature sensor 215 for detecting an intake temperature, and a water temperature sensor 216 for detecting an engine water temperature.

The electronic control unit 200 drives various control components to control the vehicle 100 based on output signals of various sensors which have been input etc. Below, the control of the vehicle 100 according to the present embodiment which the electronic control unit 200 performs will be explained.

The electronic control unit 200 drives the vehicle 100 while switching the driving mode to either of an EV (electric vehicle) mode or a CS (charge sustaining) mode based on the state of charge of the battery SOC. Specifically, the electronic control unit 200 sets the driving mode of the vehicle 100 to the EV mode if the state of charge of the battery is equal to or greater than a predetermined state of charge for switching the mode SOC1 (for example 10% of a full charged state).

The EV mode is a mode in which the charged electric power of the battery 50 is preferentially utilized to drive the second rotary electric machine 40 for powered operation and at least the drive power of the second rotary electric machine 40 is transmitted to the wheel drive shaft 2 to make the vehicle 100 run.

When the driving mode is the EV mode, the electronic control unit 200 makes the internal combustion engine 10 stop and, in that state, uses the charged electric power of the battery 50 so as to drive the second rotary electric machine 40 for powered operation and uses the drive power of the second rotary electric machine 40 alone to turn the wheel drive shaft 2 and make the vehicle 100 run. That is, when the driving mode is the EV mode, the electronic control unit 200 makes the internal combustion engine 10 stop and, in that state, controls the output of the second rotary electric machine 40 to make the vehicle 100 run based on the driving load so as to obtain the demanded output corresponding to the driving load.

On the other hand, the electronic control unit 200 sets the driving mode of the vehicle 100 to the CS (charge sustaining) mode when the state of charge of the battery SOC is less than the state of charge for switching the mode SOC1.

The CS mode is the mode where the vehicle 100 is driven so as to maintain a state of charge of the battery (below, referred to as the "charge sustaining amount") when the state of charge of the battery (SOC) is switched to the CS mode.

Figure 2:
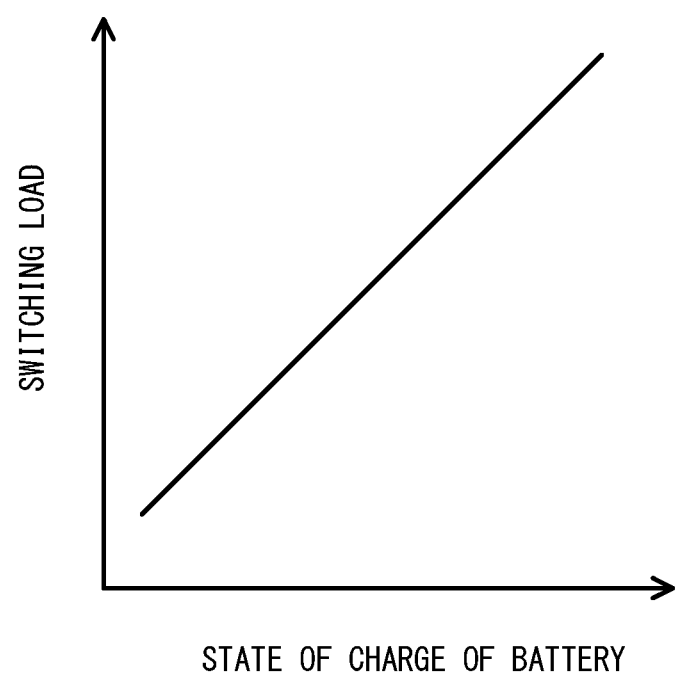
FIG. 2 is a view showing a relationship between a state of charge of the battery and a switching load.

When the driving mode is the CS mode, the electronic control unit 200 switches the driving mode to further either a CSEV mode or a CSHV mode to make the vehicle 100 run. Specifically, when the driving mode is the CS mode, if the driving load is less than the switching load, the electronic control unit 200 sets the driving mode to the CSEV mode while if the driving load is equal to or greater than the switching load, it sets the driving mode to the CSHV mode. Further, as shown in FIG. 2, the electronic control unit 200 makes the switching load change in accordance with the state of charge of the battery SOC so that the switching load becomes smaller the smaller the state of charge of the battery SOC.

The CSEV mode, in the same way as the above-mentioned EV mode, is a mode in which the charged electric power of the battery 50 is preferentially utilized to drive the second rotary electric machine 40 for powered operation and at least the drive power of the second rotary electric machine 40 is transmitted to the wheel drive shaft 2 to make the vehicle 100 run. That is, it is a mode in which the internal combustion engine 10 is made to stop and, in that state, the charged electric power of the battery 50 is used to drive the second rotary electric machine 40 for powered operation and the drive power of the second rotary electric machine 40 alone is used to make the wheel drive shaft 2 rotate and make the vehicle 100 run.

The CSHV mode is a mode in which the internal combustion engine 10 is made to operate and the generated electric power of the first rotary electric machine 30 is preferentially utilized to drive the second rotary electric machine 40 for powered operation and the drive powers of both of the internal combustion engine 10 and the second rotary electric machine 40 are transmitted to the wheel drive shaft 2 to make the vehicle 100 run. When the driving mode is the CSHV mode, the electronic control unit 200 divides the drive power of the internal combustion engine 10 into two systems by the power dividing mechanism 20, transmits one divided drive power of the internal combustion engine 10 to the wheel drive shaft 2, and uses the other drive power to drive the first rotary electric machine 30 for regenerative operation. Further, basically, the generated electric power of the first rotary electric machine 30 is used to drive the second rotary electric machine 40 for powered operation. In addition to one divided drive power of the internal combustion engine 10, the drive power of the second rotary electric machine 40 is transmitted to the wheel drive shaft 2 to make the vehicle 100 run.

In this way, when the driving mode is the CS mode, the electronic control unit 200 controls the outputs of the internal combustion engine 10 and the second rotary electric machine 40 to make the vehicle 100 run so as to obtain a demanded output corresponding to the driving load based on the state of charge of the battery SOC and the driving load. The switching load when the state of charge of the battery SOC is the state of charge for switching the mode SOC1 is low, so when the state of charge of the battery SOC falls to the state of charge for switching the mode SOC1 while the vehicle is running and the driving mode is switched from the EV mode to the CS mode, basically the internal combustion engine 10 is started up. Therefore, the CS mode can also be said to be basically a driving mode predicated on making the internal combustion engine 10 operate wherein under conditions of a poor heat efficiency of the internal combustion engine 10, the output of the second rotary electric machine 40 alone can be used to make the vehicle 100 run.

Note that when the driving mode is the CS mode, when the vehicle 100 is stopped and the state of charge of the battery becomes less than the charge sustaining amount, the electronic control unit 200 uses the drive power of the internal combustion engine 10 to drive the first rotary electric machine 30 for regenerative operation so that the state of charge of the battery becomes equal to or greater than the charge sustaining amount and uses the generated electric power of the first rotary electric machine 30 to charge the battery 50.

Here, as explained above, the CS mode is basically a driving mode predicated on making the internal combustion engine 10 operate. After the driving mode is switched from the EV mode to the CS mode, basically the internal combustion engine 10 is started up. Further, the EV mode is switched to the CS mode dependent on the state of charge of the battery SOC. If the EV mode is switched to the CS mode and the internal combustion engine 10 is started up, the exhaust discharged from the exhaust passage 14 from the cylinders 12 of the engine body 11 flow through the exhaust passage 14 and is discharged into the atmosphere.

The harmful substances in the exhaust can be removed at the catalyst device 15 if the catalyst device 15 finishes warming up, that is, if the temperature of the conductive base 151 TEHC (° C.) (below, referred to as the "catalyst bed temperature") becomes equal to or greater than a predetermined activation temperature TEHC2 (for example, 450° C.) at which the exhaust purification function of the catalyst carried on the conductive base 151 is activated.

On the other hand, right after startup of the internal combustion engine 10 and otherwise before the catalyst device 15 finishes warming up, if the catalyst bed temperature TEHC becomes equal to or greater than a predetermined activation start temperature TEHC1 (for example, 300° C.) lower than the activation temperature TECH2, the exhaust purification function of the catalyst carried at the conductive base 151 starts to function, but the harmful substances in the exhaust cannot be sufficiently removed at the catalyst device 15, so the exhaust emission deteriorates. Therefore, to keep the exhaust emission after engine startup from deteriorating, during the EV mode, it is preferable to start to supply current to the conductive base 151 to start warmup of the catalyst device 15 and make the catalyst device 15 finish warming up before switching to the CS mode.

Therefore, for example, after the state of charge of the battery SOC falls to the state of charge for starting warmup SOC2 larger than the state of charge for switching the mode SOC1 during the EV mode, current starts to be supplied to the conductive base 151 to warm up the catalyst device 15. The catalyst device 15 may be made to finish warming up in the EV mode before the state of charge of the battery SOC falls from the state of charge for starting warmup SOC2 to the state of charge for switching the mode SOC1, that is, before the EV mode is switched to the CS mode.

However, if not setting the state of charge for starting warmup SOC2 to a suitable value, the state of charge of the battery SOC is liable to end up falling to the state of charge for switching the mode SOC1 before the catalyst device 15 finishes warming up. If this is so, the internal combustion engine 10 is liable to be started before the catalyst device 15 finishes warming up. As a result, the exhaust emission is liable to deteriorate after startup of the internal combustion engine 10. Further, in this case, to make the catalyst device 15 finish warming up early, for example, it is preferable to perform control to delay the ignition timing etc. to make the exhaust temperature a higher temperature than usual to make the internal combustion engine 10 operate, but while delaying the ignition timing, the ratio of the heat energy discharged without being utilized as output energy in the combustion energy increases, so deterioration of the heat efficiency is invited and as a result the fuel efficiency deteriorates.

Further, conversely to this, the time from when the catalyst device 15 finishes warming up to when the state of charge of the battery SOC falls to the state of charge for switching the mode SOC1 is liable to become too long.

After the catalyst device 15 finishes warming up, if supplying electric power to the conductive base 151 to continue to heat the conductive base 151 until the state of charge of the battery SOC falls to the state of charge for switching the mode SOC1, the electric power is wastefully consumed and the distance able to be run in the EV mode (below, referred to as the "EV running distance") ends up becoming shorter. Further, the conductive base 151 ends up being excessively heated and, for example, deterioration of the conductive base 151 is liable to be promoted.

Further, if switching the driving mode to the CS mode at the time when the catalyst device 15 finishes warming up, the driving mode is switched to the CS mode before the state of charge of the battery SOC becomes equal to or less than the state of charge for switching the mode SOC1, so the EV running distance ends up becoming shorter. Further, if stopping the supply of current to the conductive base 151 at the time when the catalyst device 15 finishes warming up, the temperature of the conductive base 151 will fall before the state of charge of the battery SOC becomes equal to or less than the state of charge for switching the mode SOC1, so the exhaust emission is liable to deteriorate after startup of the internal combustion engine 10.

Here, the amount of heat Q (J) required for making the catalyst bed temperature TEHC rise from a certain initial temperature TEHC0 to the activation temperature TEHC2, that is, the amount of electric power (below, referred to as the "base heating-use electric power") $W_h$ (Ws), can be expressed by the following formula (1) where the heat capacity of the conductive base 151 is C.

[Mathematical 1]

$$W_h = C \times (TEHC2 - TEHC0) \quad (1)$$

Further, the base supplied electric power $P_h$ when, like in the present embodiment, controlling the base applied voltage $V_h$ to a certain rated voltage $V_{max}$ to heat the conductive base 151 can be expressed by the following formula (2) using the base resistance value R:

[Mathematical 2]

$$P_h = \frac{V_{max}^2}{R} \quad (2)$$

Therefore, if, like in the present embodiment, controlling the base applied voltage $V_h$ to a certain rated voltage $V_{max}$ to heat the conductive base 151, the heating time $t_h$(s) required for making the catalyst bed temperature TEHC rise from the initial temperature TEHC0 to the activation temperature TEHC2 can be expressed by the following formula (3):

[Mathematical 3]

$$t_h = \frac{W_h}{P_h} = W_h \times \frac{R}{V_{max}^2} \quad (3)$$

Further, if starting to supply current to the conductive base 151 to warm up the catalyst device 15 during the EV mode, to heat the conductive base 151, not only the base supplied electric power $P_h$ supplied to the conductive base 151, but also the electric power for driving the second rotary electric machine 40 for powered operation, the electric power for driving the air-conditioner and various other types of auxiliary equipment, that is, the drive-use electric power $P_p$ for making the vehicle 100 run, becomes necessary.

Therefore, if making the driving-use electric power required for making the vehicle 100 run in the EV mode for exactly the heating time $t_h$ the value $W_p$, the state of charge for starting warmup SOC2 is, for example, set according to the following formula (4). When the state of charge of the battery SOC falls to the state of charge for starting warmup SOC2 during the EV mode, if starting to supply current to the conductive base 151 to start warming up the catalyst device 15, during the EV mode where the state of charge of the battery SOC falls from the state of charge for starting warmup SOC2 to the state of charge for switching the mode SOC1, it is considered possible to suitably finish warming up the catalyst device 15. Note that, if finding in advance by experiments etc. the driving-use electric power $W_p$, for example, the average amount of electric power $W_{av}$ per unit time used when making the vehicle 100 run in the EV mode, this can be calculated based on the following formula (5):

[Mathematical 4]

$$SOC2 = W_h + W_p + SOC1 \quad (4)$$

$$W_p = W_{av} \times t_h \quad (5)$$

However, the conductive base 151 sometimes suffers from microcracks due to aging etc. As a result, the base resistance value R sometimes rises from the initial resistance value R0 at the time of product shipment etc. This being so, as clear from the above formula (2) and formula (3), the base supplied electric power $P_h$ decreases by exactly the amount of rise of the base resistance value R from the initial resistance value R0. As a result, heating time $t_h$ becomes longer by exactly the amount of rise of the base resistance value R from the initial resistance value R0. More specifically, if making the heating time when the base resistance value R is the initial resistance value R0 the standard heating time $t_{h0}$, making the heating time when the base resistance value R increases to R1 the value $t_{h1}$, and making the rate of increase of resistance the value "r" (=R1/R0), as shown in the following formula (6), the heating time $t_{h1}$ becomes longer by exactly "r" times the standard heating time $t_{h0}$.

[Mathematical 5]

$$t_{h1} = t_{h0} \times r \quad (6)$$

Further, if the heating time $t_h$ becomes longer, as clear from the above formula (4) and formula (5), the driving-use electric power $W_p$ increases by exactly the amount by which the heating time $t_h$ becomes longer. As a result, the state of charge for starting warmup SOC2 also becomes larger. That is, if the base resistance value R increases, the amount of electric power required until the catalyst device 15 finishes warming up increases.

In this way, the suitable value of the state of charge for starting warmup SOC2 forming the threshold value for start of supply of current to the conductive base 151 changes in accordance with the base resistance value R. If making the state of charge for starting warmup SOC2 larger when the base resistance value R is large compared to when it is small, the state of charge of the battery SOC is liable to end up falling to the state of charge for switching the mode SOC1 before the catalyst device 15 finishes warming up. Therefore, in the present embodiment, the state of charge for starting warmup SOC2 is set in accordance with the base resistance value R, then the catalyst device 15 is warmed up. Below, the control for warmup of the catalyst according to the present embodiment will be explained.

Figure 3:
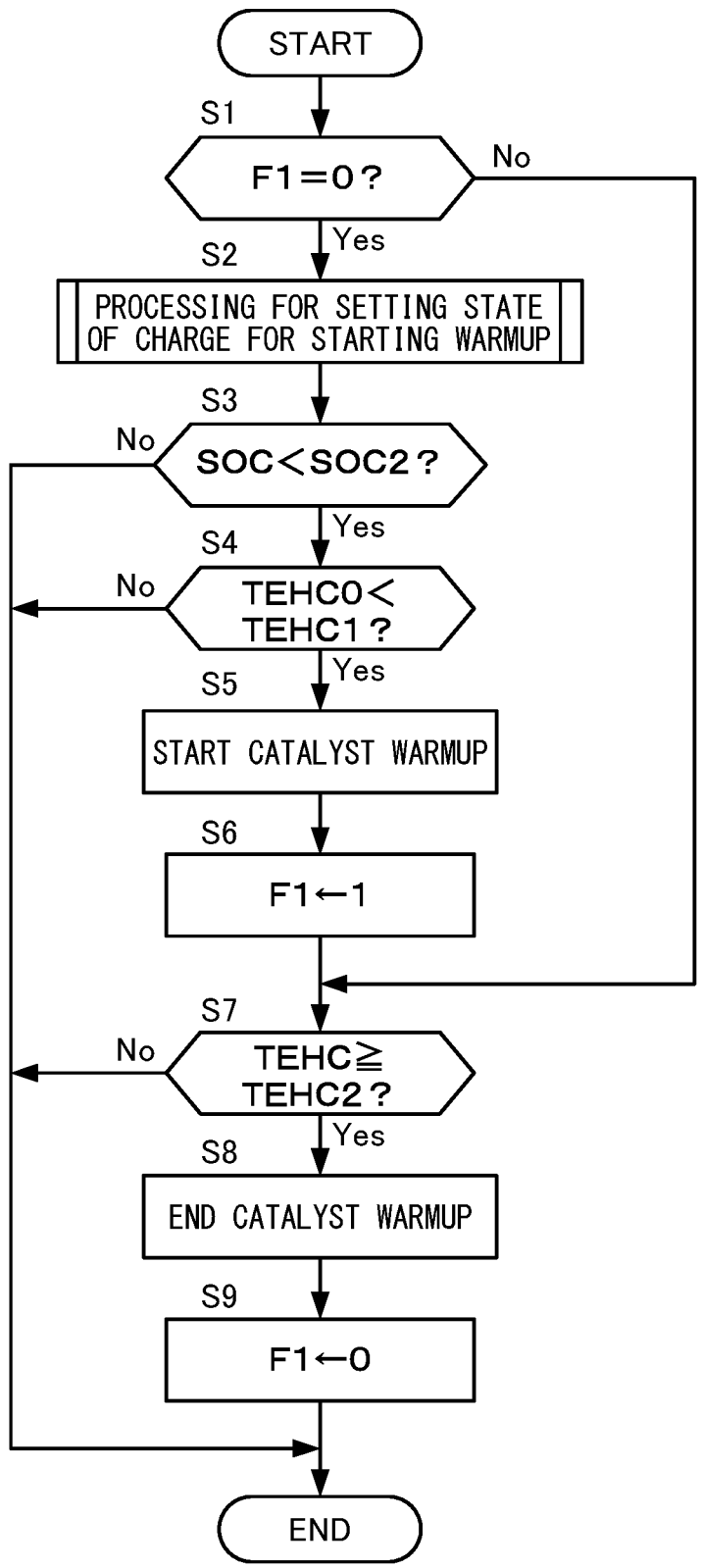
FIG. 3 is a flow chart explaining catalyst warmup control according to one embodiment of the present disclosure.

FIG. 3 is a flow chart explaining the control for warmup of the catalyst according to the present embodiment. The electronic control unit 200 repeatedly performs the present routine by a predetermined processing period (for example, 10 ms).

At step S1, the electronic control unit 200 judges if the catalyst warmup start flag F1 has been set to "0". The catalyst warmup start flag F1 is a flag set to "1" when starting to warm up the catalyst device 15. The initial value is set to "0". The electronic control unit 200 proceeds to step S2 if the catalyst warmup start flag F1 is "0". On the other hand, the electronic control unit 200 proceeds to step S7 if the catalyst warmup start flag F1 is "1".

Figure 4:
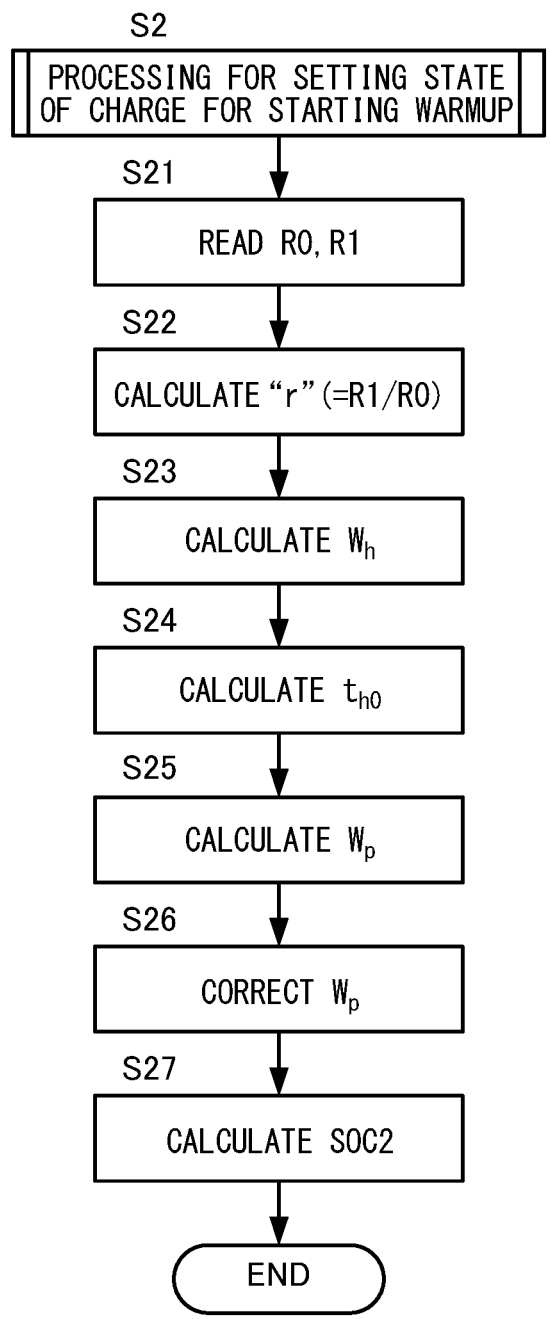
FIG. 4 is a flow chart explaining processing for setting a state of charge for starting warmup according to one embodiment of the present disclosure.

At step S2, the electronic control unit 200 performs processing for setting the warmup start state so as to set the state of charge for starting warmup SOC2 corresponding to the base resistance value R. Details of the processing for setting the warmup start state will be explained with reference to FIG. 4.

At step S21, the electronic control unit 200 reads the base resistance value R detected when supplying current to the conductive base 151 and warming up the catalyst device 15 the previous time and stored in the memory as the previous base resistance value R1. Further, the electronic control unit 200 reads the initial resistance value R0 stored in advance in the memory. Note that, in the present embodiment, the typical base resistance value R at the time of shipment of the product found in advance by experiments etc. is made the initial resistance value R0, but the base resistance value R detected at the time of the initial supply of current to the conductive base 151 may also be made the initial resistance value R0. The average value of the base resistance values R detected a plurality of times from the initial time may also be made the initial base resistance value R0.

At step S22, the electronic control unit 200 calculates the rate of increase of resistance "r" (=R1/R0) based on the previous base resistance value R1 and initial resistance value R0.

At step S23, the electronic control unit 200 reads the estimated value of the current catalyst bed temperature TEHC calculated at any time by the control for calculation of the catalyst bed temperature performed separately from the present routine as the initial temperature TEHC0 and calculates the base heating-use electric power $W_h$ based on the above-mentioned formula (1). Note that, the control for calculation of the catalyst bed temperature will be explained later referring to FIG. 5.

At step S24, the electronic control unit 200 calculates the heating time when the base resistance value R is the initial resistance value R0, that is, the standard heating time $t_{h0}$, based on the above-mentioned formula (3).

At step S25, the electronic control unit 200 enters the standard heating time $t_{h0}$ into the above-mentioned formula (5) to calculate the driving-use electric power $W_p$ if the base resistance value R is the initial resistance value R0.

At step S26, the electronic control unit 200 corrects the driving-use electric power $W_p$ calculated at step S25 in accordance with the following formula (7) based on the rate of increase of resistance "r":

[Mathematical 6]

$$W_p = W_p \times r \qquad (7)$$

At step S27, the electronic control unit 200 enters the base heating-use electric power $W_h$ calculated at step S23, the driving-use electric power $W_p$ corrected at step S26, and the state of charge for switching the mode SOC1 into the above-mentioned formula (4) to calculate the state of charge for starting warmup SOC2. If in this way the base resistance value R increases, it is possible to upwardly correct the driving-use electric power $W_p$, which directly causes an increase in the amount of electric power required until the catalyst device 15 is made to finish warming up, in accordance with the rate of increase of resistance "r" to thereby set the state of charge for starting warmup SOC2 to a suitable value.

Returning to FIG. 3, at step S3, the electronic control unit 200 judges if the state of charge of the battery SOC is less than the state of charge for starting warmup SOC2. The electronic control unit 200 proceeds to the processing of step S4 if the state of charge of the battery SOC is less than the state of charge for starting warmup SOC2. On the other hand, the electronic control unit 200 ends the current processing if the state of charge of the battery SOC is equal to or greater than the state of charge for starting warmup SOC2.

At step S4, the electronic control unit 200 judges if the current catalyst bed temperature TEHC, that is, the initial temperature TEHC0, read at step S23 is less than the activation start temperature TEHC1. The electronic control unit 200 proceeds to the processing of step S5 if the initial temperature TEHC0 is less than the activation start temperature TEHC1. On the other hand, if the initial temperature TEHC0 is equal to or greater than the activation start temperature TEHC1, the electronic control unit 200 ends the current processing since the exhaust purification function of the catalyst starts to come into play. Note that, in the present embodiment, at the present step, it judges if the initial temperature TEHC0 is less than the activation start temperature TEHC1 and proceeds to the processing of step S5 or ends the current processing, but it may also judge if the initial temperature TEHC0 is less than the activation temperature TEHC2 and proceed to the processing of step S5 or end the current processing.

At step S5, the electronic control unit 200 starts the supply of current to the conductive base 151 to warm up the catalyst device 15. In the present embodiment, if the base applied voltage $V_h$ becomes the rated voltage $V_{max}$, the electronic control unit 200 controls the voltage adjustment circuit 153 to start warmup of the catalyst device 15. At this time, the electronic control unit 200 calculates the base resistance value R based on the base applied voltage $V_h(=V_{max})$ detected by the voltage sensor 154 and the base current value $I_h$ detected by the current sensor 155 and stores the base resistance value R in the memory. The base resistance value R stored in this memory is read in as the previous base resistance value R1 at the above-mentioned step S21 during processing for setting the state of charge for starting warmup when next warming up the catalyst device 15.

At step S6, the electronic control unit 200 sets the catalyst warmup start flag F1 to "1".

At step S7, the electronic control unit 200 judges if the catalyst bed temperature TEHC has become equal to or greater than the activation temperature TEHC2. In the present embodiment, if the cumulative value of the base supplied electric power $P_h$ from when starting warmup of the catalyst device 15, that is, the amount of electric power supplied to the conductive base 151, becomes equal to or greater than the base heating-use electric power $W_h$, the electronic control unit 200 judges that the catalyst bed temperature TEHC has become equal to or greater than the activation temperature TEHC2 and proceeds to the processing of step S8. On the other hand, the electronic control unit 200 ends the current processing if the catalyst bed temperature TEHC is less than the activation temperature TEHC2.

At step S8, the electronic control unit 200 stops the supply of current to the conductive base 151 and ends warmup of the catalyst device 15.

At step S9, the electronic control unit 200 returns the catalyst warmup start flag F1 to 0.

Figure 5:
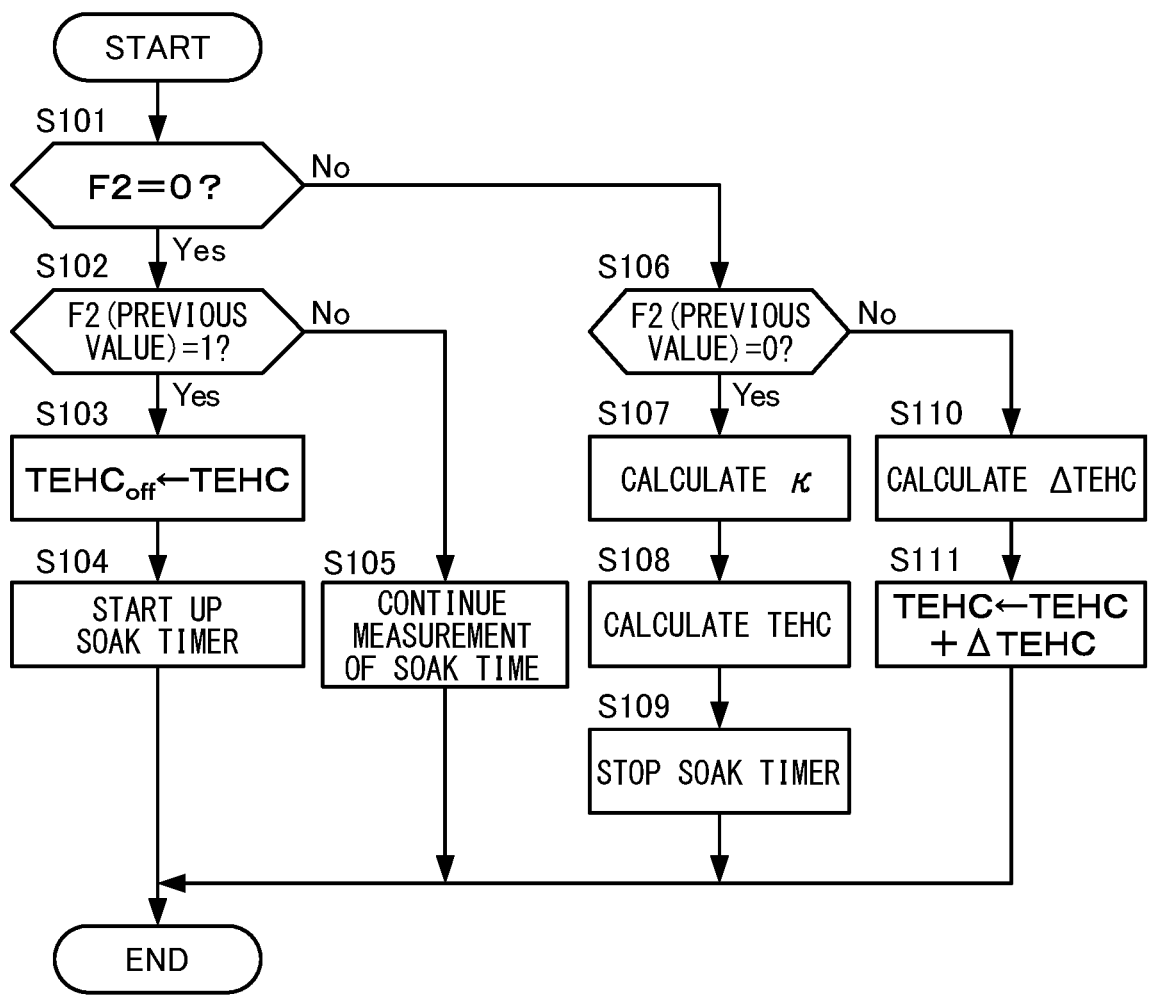
FIG. 5 is a flow chart explaining control for calculating a catalyst bed temperature according to one embodiment of the present disclosure.

FIG. 5 is a flow chart explaining the control for calculation of the catalyst bed temperature. The electronic control unit 200 repeatedly performs the present routine by a predetermined processing period (for example, 10 ms).

At step S101, the electronic control unit 200 reads the engine operation flag F2 and judges if the engine operation flag F2 is set to "0". The engine operation flag F2 is a flag separately set from the present routine. It is set to "1" when making the internal combustion engine 10 start and is returned to "0" when making the internal combustion engine 10 stop. The initial value is set to "0". The electronic control unit 200 proceeds to the processing of step S102 if the engine operation flag F2 is "0". On the other hand, the electronic control unit 200 proceeds to the processing of step S106 if the engine operation flag F2 is "1".

At step S102, the electronic control unit 200 judges if the previous value of the engine operation flag F2 was "1", that is, right after the stopping the engine (whether the initial processing after stopping the engine). The electronic control unit 200 proceeds to the processing of step S103 if the previous value of the engine operation flag F2 was "1", that is, right after stopping the engine. On the other hand, the electronic control unit 200 proceeds to the processing of step S105 if the previous value of the engine operation flag F2 was "1", that is, the engine was stopped.

At step S103, the electronic control unit 200 stores the catalyst bed temperature TEHC currently stored in the memory (catalyst bed temperature TEHC estimated during engine operation and stored in the memory at the later explained step S111) as the catalyst bed temperature $TEHC_{off}$ when the engine is stopped.

At step S104, the electronic control unit 200 starts up a soak timer counting the time until the internal combustion engine 10 is started up after being stopped (below, referred to as the "soak time") and starts measuring the soak time.

At step S105, the electronic control unit 200 continues measuring the soak time by the soak timer.

At step S106, the electronic control unit 200 judges if the previous value of the engine operation flag F2 was "0", that is, if it is right after engine startup (whether initial processing after engine startup). The electronic control unit 200 proceeds to the processing of step S107 if the previous value of the engine operation flag F2 was "0", that is, if it is right after engine startup. On the other hand, the electronic control unit 200 proceeds to the processing of step S110 if the previous value of the engine operation flag F2 was "1", that is, if it is during engine operation.

Figure 6:
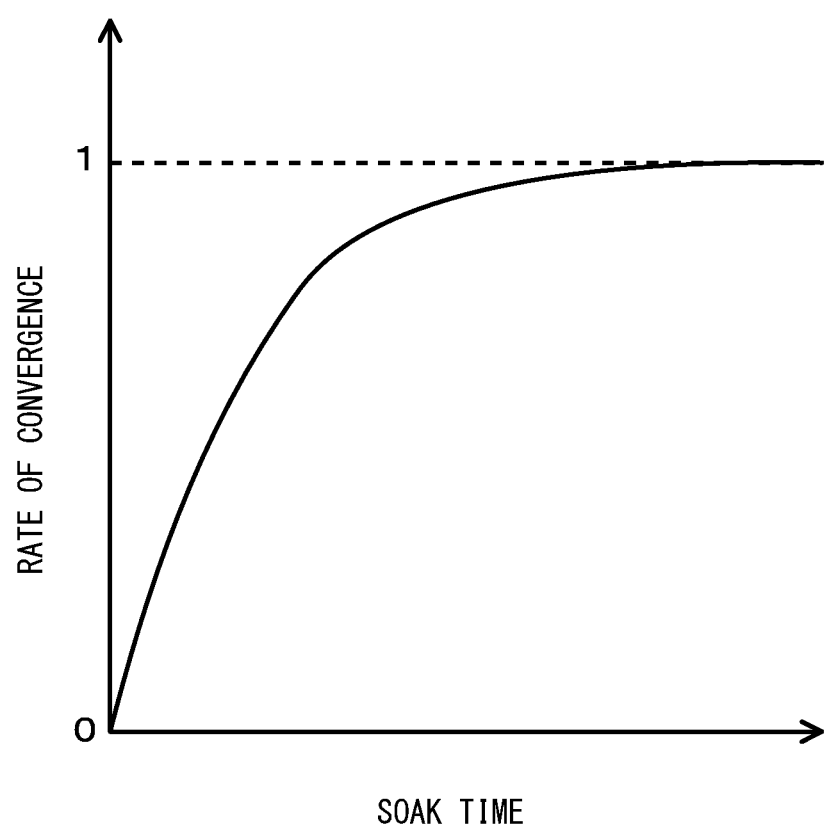
FIG. 6 is a map for calculating a rate of convergence κ of the catalyst bed temperature to an outside air temperature based on a soak time.

At step S107, the electronic control unit 200 refers to the map shown in FIG. 6 set in advance by experiments etc. and calculates a rate of convergence κ of the catalyst bed temperature TEHC to the outside air temperature based on the soak time. As shown in FIG. 6, the rate of convergence κ takes a value from 0 to 1. When the rate of convergence κ is 1, it shows that the catalyst bed temperature TEHC is converging to a temperature the same as the outside air temperature.

At step S108, the electronic control unit 200, for example, enters the catalyst bed temperature $TEHC_{off}$ and the intake temperature (≈outside air temperature) TIN at the time of engine stop into the following formula (8) to calculate the current catalyst bed temperature (that is, catalyst bed temperature at the time of engine start) TEHC and stores the catalyst bed temperature TEHC in the memory.

[Mathematical 7]

$$TEHC = TEHC_{off} + (TIN - TEHC_{off}) \times \kappa \qquad (8)$$

At step S109, the electronic control unit 200 returns the soak time to "0" and stops the soak timer.

At step S110, the electronic control unit 200 reads the detected values of the estimation-use parameters for estimating the catalyst bed temperature TEHC during engine operation and calculates the amount of temperature change ΔTEHC of the catalyst bed temperature TEHC per unit time (processing period) based on the detected values of the estimated parameters. The catalyst bed temperature TEHC during engine operation changes due to the effect of the exhaust heat, so for example it is possible to suitably select one or more parameters from the engine speed or engine load, engine water temperature, amount of intake, intake temperature, and other parameters having an effect on the amount of heat energy of the exhaust for use as an estimation-use parameter.

At step S111, the electronic control unit 200 adds the amount of temperature change ΔTEHC to the catalyst bed temperature TEHC stored in the memory to update the catalyst bed temperature TEHC and store the updated catalyst bed temperature TEHC in the memory.

Figure 7:
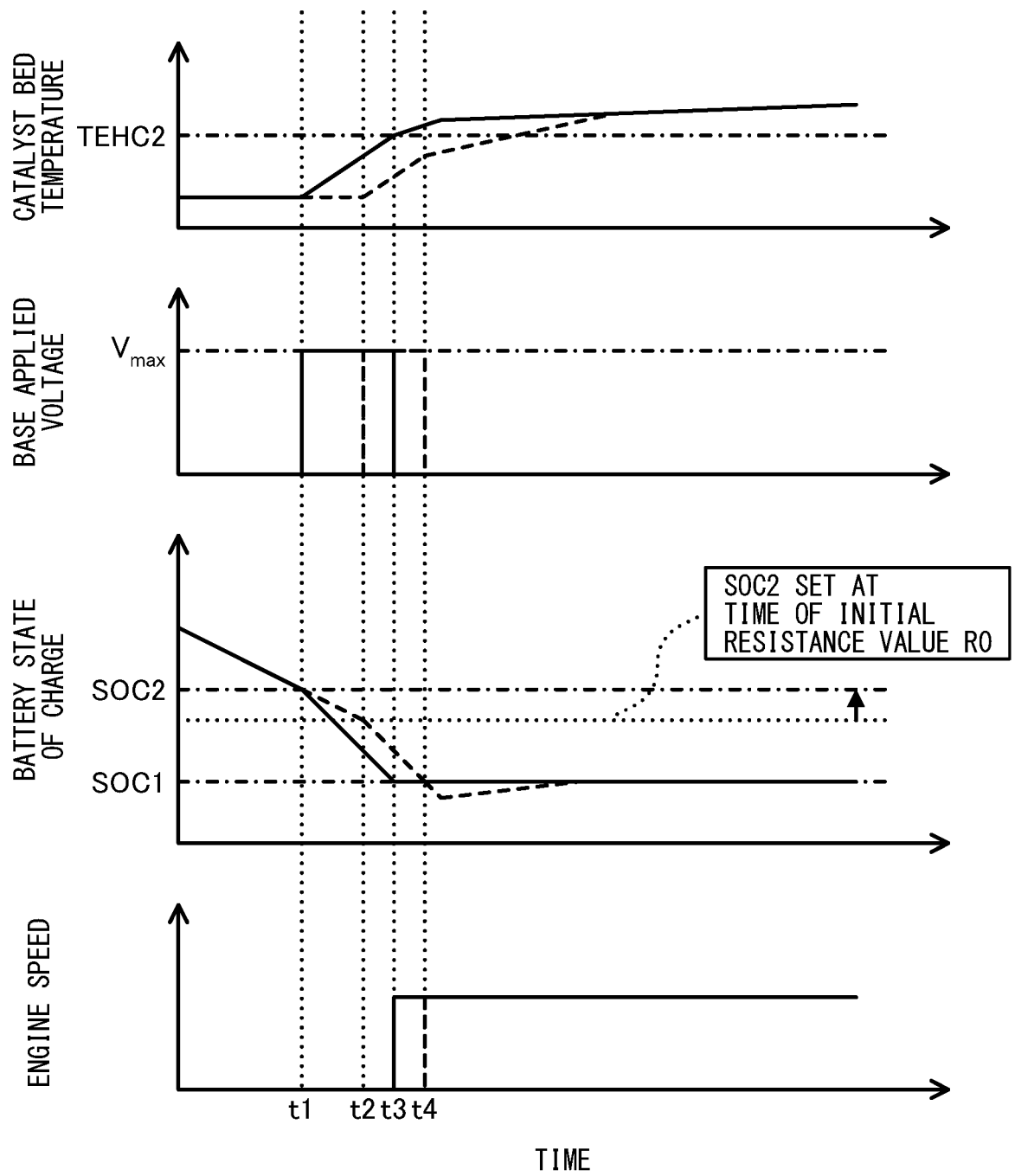
FIG. 7 is a time chart explaining operation of control for warming up a catalyst according to one embodiment of the present disclosure.

FIG. 7 is a time chart explaining the operation of the control for warmup of the catalyst according to the present embodiment. Note that, at FIG. 7, the solid lines show the operations of the parameters when performing control for warmup of the catalyst according to the present embodiment. The broken lines show the operations of the parameters when not performing control for warmup of the catalyst according to the present embodiment, that is, when not setting the state of charge for starting warmup SOC2 according to the base resistance value R.

As shown in FIG. 7 by the solid line, if performing control for warmup of the catalyst according to the present embodiment, at the time t1, the supply of current to the conductive base 151 is started if the state of charge of the battery SOC becomes the state of charge for starting warmup SOC2 set according to the base resistance value R. For this reason, until the time t3 where the state of charge of the battery SOC falls to the state of charge for switching the mode SOC1, the catalyst bed temperature TEHC can be made to rise to the activation temperature TEHC2 and the catalyst device 15 can be made to finish warming up and the internal combustion engine 10 can be made to start up after making the catalyst device 15 finish warming up.

As opposed to this, as shown in FIG. 7 by the broken line, if not performing the control for warmup of the catalyst according to the present embodiment, the time when starting the supply of current to the conductive base 151 becomes delayed to the time t2. As a result, up to the time t4 where the state of charge of the battery SOC falls to the state of charge for switching the mode SOC1, the catalyst bed temperature TEHC cannot be raised to the activation temperature TEHC2 and the internal combustion engine 10 must be started at the time t4 before the catalyst device 15 finishes warming up.

The vehicle 100 according to the present embodiment explained above is provided with an internal combustion engine 10, an electrically heated catalyst device 15 provided in an exhaust passage 14 of the internal combustion engine 10 and comprised of a conductive base 151 generating heat upon being supplied with current and carrying a catalyst, a rechargeable battery 50, and a second rotary electric machine 40 driven by electric power of the battery 50 (rotary electric machine). The electronic control unit 200 (control device) for controlling the vehicle 100 is provided with a catalyst warmup control part supplying electric power to the conductive base 151 to warm up the catalyst device 15 when the state of charge of the battery SOC is equal to or greater than a predetermined state of charge for switching the mode SOC1 (first state of charge) and the driving mode of the vehicle 100 is set to an EV mode in which at least the output of the second rotary electric machine 40 is controlled to make the vehicle 100 run if the temperature of the conductive base 151 is less than the activation start temperature TEHC1 (predetermined temperature) and the state of charge of the battery SOC is the state of charge for starting warmup SOC2 (second state of charge) larger than the state of charge for switching the mode SOC1.

Further, the catalyst warmup control part is configured to set the state of charge for starting warmup SOC2 so that the state of charge for starting warmup SOC2 becomes larger when the base resistance value R (resistance value of conductive base 151) is large compared to when it is small.

As explained above, if aging etc. causes the base resistance value R to increase, the base supplied electric power $P_h$ decreases and the heating time $t_h$ of the catalyst device 15 becomes longer compared with before the increase. As a result, the driving-use electric power $W_p$ required for heating increases, so the amount of electric power required for the catalyst device 15 to finish warming up increases. Therefore, if ending up setting the state of charge for starting warmup SOC2 serving as the threshold value for starting the supply of current to the conductive base 151 to a value similar to before the base resistance value R increases, the state of charge of the battery SOC is liable to end up falling to the state of charge for switching the mode SOC1 before the catalyst device 15 finishes warming up.

As opposed to this, by making the state of charge for starting warmup SOC2 larger if the base resistance value R is large compared to if it is small like in the present embodiment, it is possible to keep the state of charge of the battery SOC from ending up falling to the state of charge for switching the mode SOC1 before the catalyst device 15 finishes warming up. Therefore, it is possible to keep the internal combustion engine 10 from ending up being started up before the catalyst device 15 finishes warming up, so it is possible to keep the exhaust emission from deteriorating after startup of the internal combustion engine 10. Further, it is also no longer necessary to perform control for making the exhaust temperature a higher temperature than usual after startup of the internal combustion engine 10, so it is also possible to keep the fuel efficiency from deteriorating.

Further, the control for warmup of the catalyst according to the present embodiment is specifically configured to make the state of charge for starting warmup SOC2 larger than the state of charge for starting warmup SO2 set when the base resistance value R is the initial resistance value R0 the larger the base resistance value R from a predetermined initial resistance value R0 (standard resistance value).

Due to this, when aging etc. causes an increase of the base resistance value R from the initial resistance value R0, it is possible to suitably set the state of charge for starting warmup SOC2 in accordance with the amount of increase.

Further, the catalyst warmup control part according to the present embodiment more specifically is configured to upwardly correct the driving-use electric power $W_p$ (first amount of electric power) of the estimated value of the amount of electric power used for driving the second rotary electric machine 40 to make the vehicles 100 run during warmup of the catalyst device 15 based on the rate of increase of resistance "r" of the base resistance value R from the initial resistance value R0 and to set the state of charge for starting warmup SOC2 based on the state of charge for switching the mode SOC1, the upwardly corrected driving-use electric power $W_p$, and the base heating-use electric power $W_h$ (second amount of electric power) of the estimated value of the amount of electric power used for heating the conductive base 151 during warmup of the catalyst device 15.

Due to this, if the base resistance value R increases, it is possible to upwardly correct the driving-use electric power $W_p$ directly causing an increase of the amount of power required until the catalyst device 15 finishes warming up in accordance with the rate of increase of resistance "r", so it is possible to set the state of charge for starting warmup SOC2 to a suitable value. For this reason, it is possible to keep the state of charge of the battery SOC from falling to the state of charge for switching the mode SOC1 before the catalyst device 15 finishes warming up and keep the state of charge for starting warmup SOC2 from ending up being set to an excessively large value so as to keep the time from when the catalyst device 15 finishes warming up to when the state of charge of the battery SOC falls to the state of charge for switching the mode SOC1 from ending up becoming longer.

Above, an embodiment of the present disclosure was explained, but the above embodiment only shows some of the examples of application of the present disclosure and is not meant to limit the technical scope of the present disclosure to the specific configuration of the embodiment.

For example, in the above embodiment, the base heating-use electric power $W_h$ and driving-use electric power $W_p$ were calculated and the driving-use electric power $W_p$ was upwardly corrected based on the rate of increase of resistance "r" to calculate the state of charge for starting warmup SOC2, but, for example, if making the state of charge for starting warmup SOC2 a preset fixed value, it is also possible to upwardly correct the state of charge for starting warmup SOC2 based on the rate of increase of resistance "r".

Further, in the above embodiment, control for calculation of the catalyst bed temperature was used to estimate the catalyst bed temperature TEHC, but the disclosure is not limited to this. For example, it is also possible to employ the temperature detected by a temperature sensor arranged near the conductive base 151 as the catalyst bed temperature TEHC.

The invention claimed is:
1. A control device for a vehicle,
the vehicle comprising:
an internal combustion engine;
an electrically heated catalyst device provided in an exhaust passage of the internal combustion engine and comprised of a conductive base generating heat by supplying current and carrying a catalyst;
a rechargeable battery; and
a rotary electric machine driven by electric power of the battery,
wherein the control device comprises a catalyst warmup control part configured to supply electric power to the conductive base to warm up the catalyst device if a temperature of the conductive base is less than a predetermined temperature and a state of charge of the battery is less than a second state of charge larger than a predetermined first state of charge when the state of charge of the battery is equal to or greater than the first state of charge and a driving mode of the vehicle is set to an EV mode in which at least the output of the rotary electric machine is controlled to drive the vehicle,
the catalyst warmup control part is further configured to:
set the second state of charge so that the second state of charge becomes larger in a case where a resistance value of the conductive base is large compared to when it is small;
drive the rotary electric machine during warmup of the catalyst device to upwardly correct a first amount of electric power of an estimated value of the amount of electric power used for making the vehicle run based on a rate of increase of the resistance value of the conductive base from a predetermined standard resistance value; and
set the second state of charge based on the first state of charge, the upwardly corrected first amount of electric power, and a second amount of electric power of an estimated value of the amount of electric power used for heating the conductive base during warmup of the catalyst device.

2. A control device for a vehicle,
the vehicle comprising:
- an internal combustion engine;
- an electrically heated catalyst device provided in an exhaust passage of the internal combustion engine and comprised of a conductive base generating heat by supplying current and carrying a catalyst;
- a rechargeable battery; and
- a rotary electric machine driven by electric power of the battery, wherein the control device comprises a catalyst warmup control part configured to supply electric power to the conductive base to warm up the catalyst device if a temperature of the conductive base is less than a predetermined temperature and a state of charge of the battery is less than a second state of charge larger than a predetermined first state of charge when the state of charge of the battery is equal to or greater than the first state of charge and a driving mode of the vehicle is set to an EV mode in which at least the output of the rotary electric machine is controlled to drive the vehicle, the catalyst warmup control part is further configured to:
- set the second state of charge so that the second state of charge becomes larger in a case where a resistance value of the conductive base is large compared to when it is small; and upwardly correct a preset second state of charge to set the second state of charge based on a rate of increase of the resistance value of the conductive base from a predetermined standard resistance value.

* * * * *